United States Patent
Wilson et al.

(10) Patent No.: US 8,219,922 B2
(45) Date of Patent: Jul. 10, 2012

(54) DYNAMIC POINT AND EXTEND USER INTERFACE

(75) Inventors: Richard M. Wilson, Dover, NH (US); Sandesh Bhat, Westford, MA (US); Frank L. Jania, Chapel Hill, NC (US); Darren M. Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/345,774

(22) Filed: Dec. 30, 2008

(65) Prior Publication Data

US 2010/0169805 A1   Jul. 1, 2010

(51) Int. Cl.
*G06F 3/048* (2006.01)

(52) U.S. Cl. ......... 715/762; 715/765; 715/744; 715/810

(58) Field of Classification Search .......... 345/418–475; 715/733, 741, 742, 743, 744, 700, 765, 810, 715/835, 856, 860; 717/110, 168–173, 106
See application file for complete search history.

(56) References Cited

U.S. PATENT DOCUMENTS

| | | | |
|---|---|---|---|
| 7,451,403 B1* | 11/2008 | Srinivasan et al. | 715/763 |
| 2002/0090062 A1* | 7/2002 | Mohamed Alhadad et al. | 379/67.1 |
| 2006/0064422 A1* | 3/2006 | Arthurs et al. | 707/10 |
| 2007/0240057 A1* | 10/2007 | Satterfield et al. | 715/705 |
| 2008/0189654 A1* | 8/2008 | Thomas | 715/805 |

* cited by examiner

*Primary Examiner* — Xiomar L Bautista
(74) *Attorney, Agent, or Firm* — Cuenot, Forsythe & Kim, LLC

(57) ABSTRACT

A computer-implemented method of extending a user interface of an executing application can include placing the user interface in a configure mode that allows functionality of the user interface to be extended and visually distinguishing an element of the user interface that is extendable. Responsive to a user input requesting extension of the functionality of the element, an editing window can be displayed within the user interface. The method can include receiving, within the editing window, computer-usable program code specifying extended functionality for the element and storing the computer-usable program code as part of an extension to the element. The extension can be bound to an extension point exposed for the element of the user interface.

20 Claims, 3 Drawing Sheets

DYNAMIC POINT AND EXTEND USER INTERFACE

BACKGROUND

The embodiments of the present invention relate to extending the functionality and customizing the user interface of a computer program. The ability to customize a user interface and extend the functionality of a computer program is an important consideration in computer program development is deployed. In view of the complexity of modern computer programs and the many functions such computer programs can provide, it can be difficult for software developers to anticipate each possible use or extension of a computer program by an end user.

Typically, the particular extensions implemented for a given computer program will be organization specific. That is, the extensions implemented and used by one organization will likely be different from the extensions implemented and used within another organization for the same computer program. This often stems from the fact that the functionality of computer program that is needed by many organizations is driven largely by the particular business environment in which each organization utilizes the computer program.

BRIEF SUMMARY OF THE INVENTION

The embodiments disclosed herein relate to extending the functionality of a computer program. One embodiment of the present invention can include a computer-implemented method of extending a user interface of an executing application. The method can include placing the user interface in a configure mode that allows functionality of the user interface to be extended and visually distinguishing an element of the user interface that is extendable. Responsive to a user input requesting to expand functionality of the element, an editing window can be displayed within the user interface. The method can include receiving, within the editing window, computer-usable program code specifying a function for the element and storing the computer-usable program code as part of an extension to the element. The extension can be bound to an extension point exposed for the element of the user interface.

Another embodiment of the present invention can include a computer-implemented method of extending functionality of a computer program. The method can include placing the user interface in a configure mode that allows the computer program to be extended, determining an operation performed by the computer program that is extendable and that is not represented by an element within the user interface, and displaying an indicator corresponding to the operation within the user interface. Responsive to a user selection of the indicator, an editing window can be displayed within the user interface. The method can include receiving, within the editing window, computer-usable program code specifying a function for the computer program and storing the computer-usable program code as part of an extension to the operation. The extension can be bound to an extension point exposed for the operation of the computer program.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
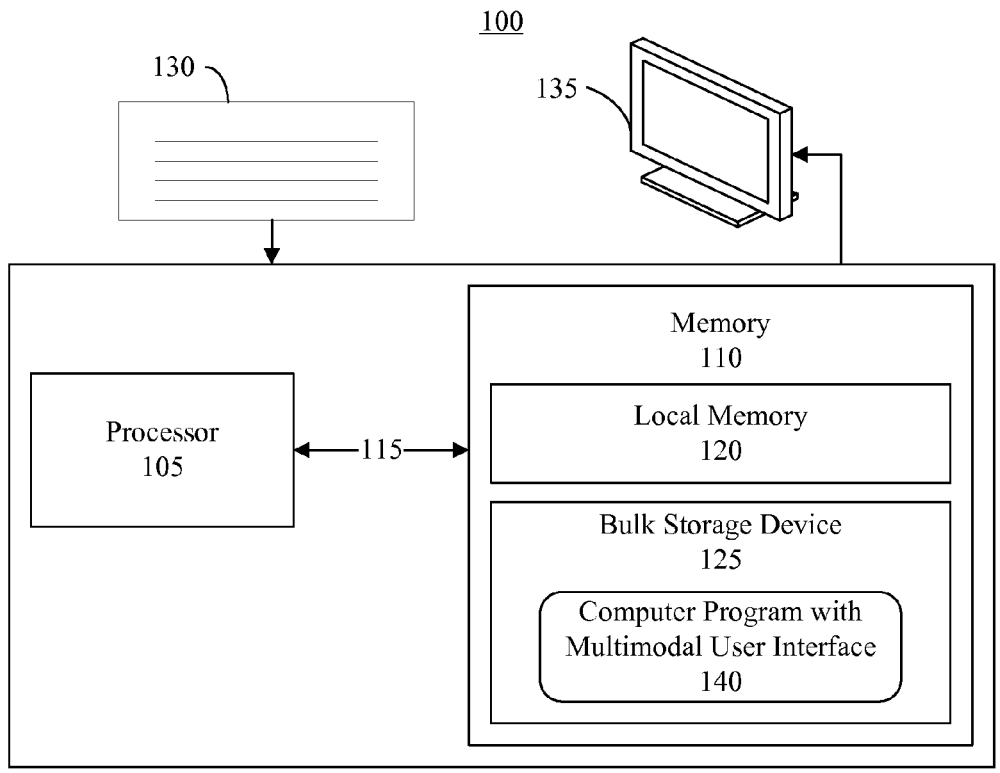
FIG. 1 is a first block diagram illustrating a system for extending functionality of a computer program in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. Computer program code also may be written in a programming language that must be compiled or a programming language that is interpreted, e.g., JavaScript, Ruby, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification allow a computer program, and a user interface of that computer program to be dynamically extended. In accordance with the inventive arrangements disclosed herein, the user interface of a computer program can be extended in a manner that provides the user with immediate visual feedback relating to the additional functionality being added. In general, a user may place a user interface of a computer program into a configure mode. While in that mode, the user may select particular elements of the user interface to extend. Additional visual cues can be provided from the computer program to guide the extension process. When complete, the functionality specified by the user can be stored and bound to the selected user interface element.

The embodiments disclosed herein can be applied to any of a variety of different user interface elements. For example, elements of a user interface including, but not limited to, menus, toolbars, sidebars, status area, side shelves, editors, viewers, and the like, can be extended using the techniques described within this specification. Once added, the newly specified function of the user interface can become immediately usable by the user of the computer program.

FIG. 1 is a first block diagram illustrating a system 100 for extending functionality of a computer program in accordance with one embodiment of the present invention. System 100 can be implemented in the form of a data processing system, e.g., a computer, that is suitable for storing and/or executing computer-usable program code. Accordingly, system 100 can include at least one processor 105 coupled directly or indirectly to memory elements denoted as memory 110 through a system bus 115. Memory 110 can include one or more physical memory devices or elements. The elements can include, for example, local memory 120 employed during actual execution of the program code, e.g., random access memory (RAM), one or more bulk storage devices 125, e.g., a hard drive or other persistent data storage device, and cache memories (not shown) which provide temporary storage of at least some program code in order to reduce the number of times code must be retrieved from bulk storage device 125 during execution.

Input/output (I/O) devices such as a keyboard 130, a display 135, and a pointing device (not shown) optionally can be coupled to system 100 as well as one or more other I/O devices. The I/O devices can be coupled to system 100 either directly or through intervening I/O controllers. Network adapters also can be coupled to system 100 to enable system 100 to become coupled to other data processing systems or remote printers or storage devices through intervening private or public networks. Modems, cable modems, and Ethernet cards are just a few of the currently available types of network adapters.

As shown, system 100 can include a computer program that includes a multimodal user interface (hereafter "computer program") 140. The user interface of computer program 140 can include a first mode, referred to as a "normal mode," that allows a user of computer program 140 to access the various elements presented within the user interface. A second mode, referred to as a "configure mode," also can be included in the user interface. The configure mode allows a user to dynamically extend the user interface of computer program 140 and associate new functionality with the user interface. While in the configure mode, the user interface can be extended by the user selecting a particular element of the user interface to extend using a pointer or other selection mechanism. While further details will be described with reference to the remaining figures, the embodiments disclosed herein provide the user with visual feedback throughout the process of extending the user interface.

Figure 2:
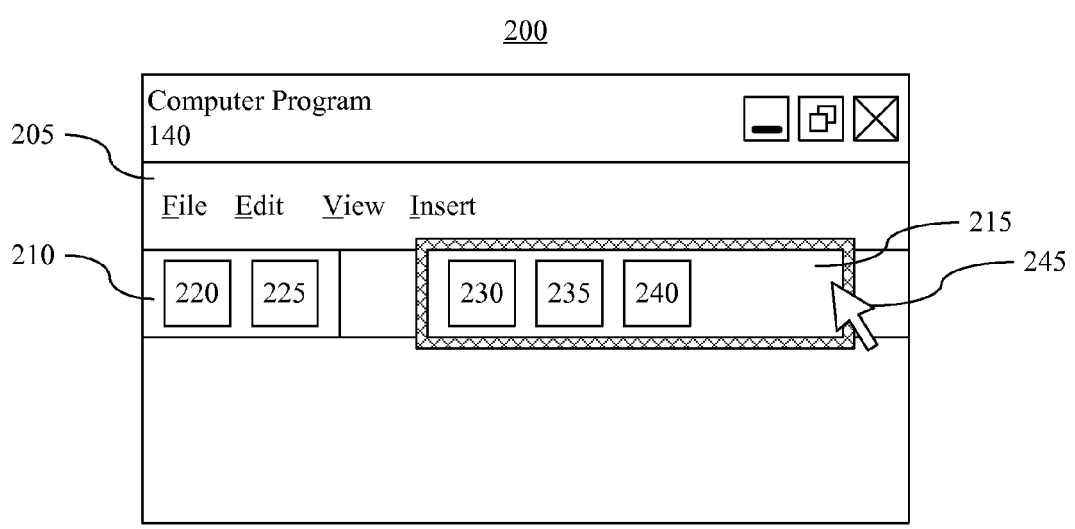
FIG. 2 is a second block diagram illustrating a user interface of a computer program that can be extended in accordance with another embodiment of the present invention.

FIG. 2 is a second block diagram illustrating a user interface 200 of a computer program that can be extended in accordance with another embodiment of the present invention. User interface 200 can be, for example, a graphical user interface (GUI). User interface 200 pictured in FIG. 2 is an example of a user interface that can be generated upon execution of computer program 140 described with reference to FIG. 1. Like numbers will be used to refer to the same elements throughout this specification. As noted, user interface 200, as generated by computer program 140 and displayed upon a display device, can be placed in one of at least two different operational modes. The first mode can be a normal operation mode in which end users perform conventional functions through user interface 200. The second mode, referred to as a configure mode, allows users to dynamically extend the functionality of user interface 200 during operation of computer program 140. For example, users can select a user interface element to extend and specify the extension code, whether in the form of script or compiled program code.

In the example pictured in FIG. 2, user interface 200 has been placed in configure mode as the user wishes to extend the functionality of some aspect of user interface 200. The user, for example, may access any of a variety of different controls provided by computer program 140 in order to change the operational mode of user interface 200 between the normal mode and the configure mode. In another aspect, rather than providing native ability to switch between the normal mode and the configure mode within computer program 140 itself, computer program 140 can be executed within an integrated development environment (IDE) that provides the different modes and provides the user the ability to switch back and forth between the modes while computer program 140 executes in the IDE.

As shown, user interface 200 can include a plurality of elements such as menu bar 205, toolbar 210, and toolbar 215. Each of these elements further can include one or more elements. For example, toolbar 210 can include a plurality of selectable controls, e.g., buttons, 220 and 225. Similarly, toolbar 215 can include a plurality of selectable controls 230, 235, and 240. When placed in configure mode, the functionality of computer program 140 and user interface 200 can be extended.

In one embodiment, computer program 140, and thus user interface 200, can be specified in terms of a plurality of plug-ins, each specifying a particular functionality or aspect of computer program 140. For example, with reference to FIG. 2, one plug-in can be responsible for generating menu bar 205. Another plug-in can be responsible for generating toolbar 210, and another for generating toolbar 215. Each plug-in may, or may not, allow for additional functionality to be specified, and thus, added to the related visual element, e.g., elements 205, 210, and/or 215. One way of allowing functionality to be added is by exposing "extension points." Each plug-in, for example, may expose one or more extension points to be described herein in greater detail.

Within configure mode, movement of pointer 245 can be tracked. Input received from the user can be intercepted, e.g., pointer movements and selections. As pointer 245 is moved over a particular element of user interface 200, such as menu bar 205, toolbar 210, or toolbar 215, that element can be visually distinguished from other elements of user interface 200. In the example shown, pointer 245 is placed over, e.g., is hovering over, toolbar 215. Accordingly, toolbar 215 has been highlighted and visually distinguished from menu bar 205 and toolbar 210.

Visually distinguishing an element of user interface 200 in this manner indicates that the selected element can be functionally extended as will be described in greater detail within this specification. For example, only those elements of user interface 200 that have one or more extension points exposed, e.g., correspond to a module with one or more exposed extension points, may be visually distinguished. It should be appreciated that hovering pointer 245 over a particular element of user interface 200 is one manner of selecting the element or providing user input to a system 100. In one embodiment, when user interface 200 is placed in configure mode, each element of user interface 200 that can be extended can be visually distinguished, whether or not the user hovers pointer 245 over such element.

In another embodiment, when in configure mode, computer program 140 can access an access control list specifying rights of different users to extend the functionality of user interface 200 or computer program 140. For example, when placed in configure mode, computer program 140 can load or read the access control list. The access control list can indicate which users are permitted to modify which elements of the displayed user interface 200. In this example, visually distinguishing toolbar 215 indicates that the user is permitted, according to the access control list, to modify the functionality of toolbar 215. If, for example, the user is not permitted to modify the functionality of toolbar 210, when the user moves pointer 245 over toolbar 210, toolbar 210 would not be visually distinguished or highlighted as the user is not permitted to modify that element of user interface 200. In an embodiment in which any extendable visual elements are automatically visually distinguished when placed in configure mode, each element of user interface 200 that the user is permitted to extend according to the access control list can be visually distinguished.

Figure 3:
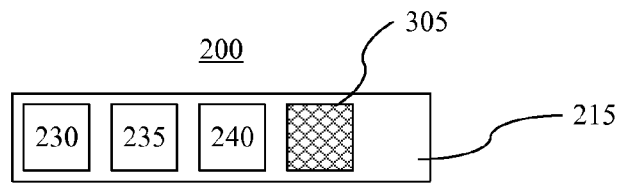
FIG. 3 is a third block diagram illustrating a portion of the user interface of FIG. 2 in accordance with another embodiment of the present invention.

FIG. 3 is a third block diagram illustrating a portion of user interface 200 of FIG. 2 in accordance with another embodiment of the present invention. For purposes of illustration, various elements of user interface 200, e.g., menu bar 205 and toolbar 210, are not shown. FIG. 3 illustrates the state of toolbar 215 after the user has placed user interface 200 in configure mode when a different technique for visually distinguishing an extendable element of user interface 200 is used. In this example, a control 305 is included within toolbar 215 in lieu of highlighting to indicate that toolbar 215 is extendable.

It should be appreciated that the particular manner in which extendable elements of a user interface are visually distinguished from those that are not extendable is not intended to be limiting. Extendable visual elements can be indicated as such when user interface 200 is placed in configure mode in any of a variety of different ways, e.g., highlighting, changing the color of the element, including an additional indicator, e.g., an additional specially colored or marked control, e.g., a button, or the like. The examples noted within this specification are provided for purposes of illustration only and, as such, are not intended to limit the embodiments described.

Figure 4:
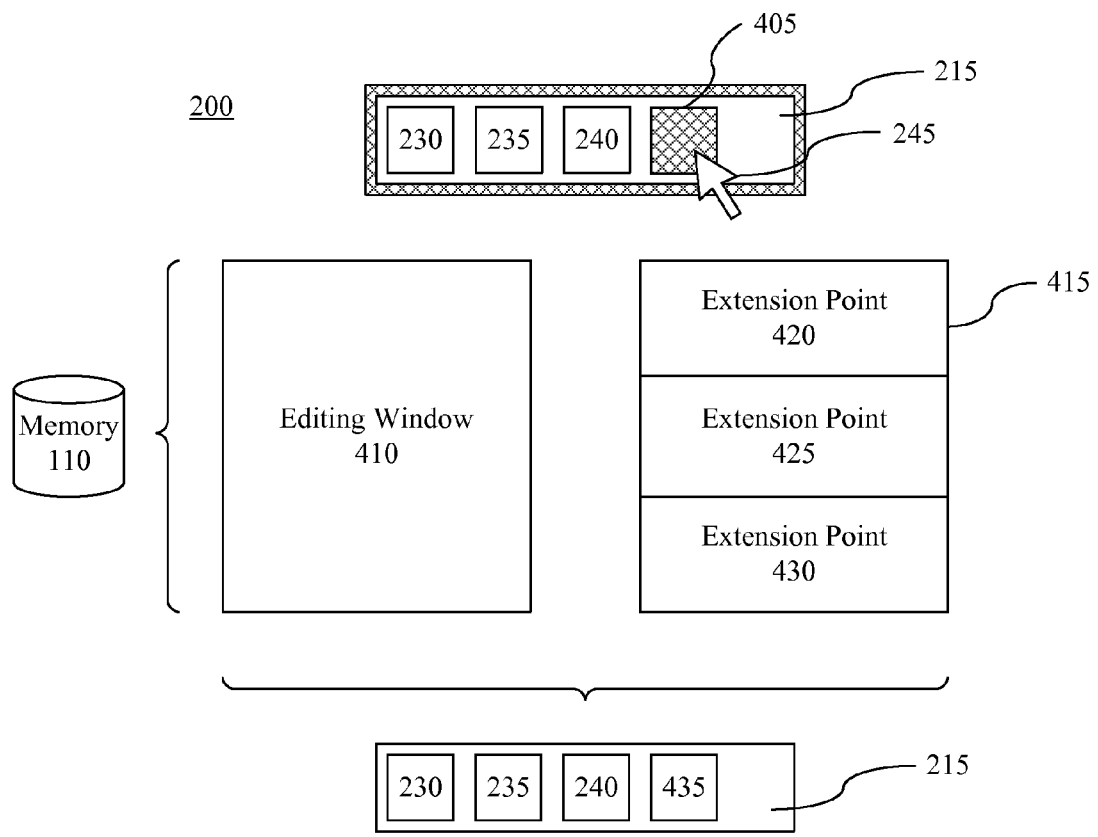
FIG. 4 is a third block diagram illustrating a portion of the user interface of FIG. 2 in accordance with another embodiment of the present invention.

FIG. 4 is a third block diagram illustrating a portion of user interface 200 of FIG. 2 in accordance with another embodiment of the present invention. For purposes of illustration, various elements of user interface 200, e.g., menu bar 205 and toolbar 210, are not shown. FIG. 4 illustrates the state of toolbar 215 after user interface 200 has been placed in configure mode. In this example, the user has selected toolbar 215 by hovering pointer 245 over toolbar 215.

In the example pictured, the user has selected toolbar 215 by hovering pointer 245 over the toolbar 215. Accordingly, toolbar 215 is highlighted, indicating that toolbar 215 may be extended in terms of functionality by the user. In this example, responsive to a further selection of toolbar 215, e.g., a left click, when in configure mode, an editing window 410 and a list 415 of extension points available or corresponding to toolbar 215 can be displayed.

It should be appreciated that in the embodiment described with reference to FIG. 3, a user can select the additional control 305 to accomplish largely the same result. That is, rather than selecting the element to be extended directly, a user can select the indicator that is displayed within the element when user interface 200 is placed in configure mode. When the indicator, e.g., control 305 of FIG. 3, is selected, editing window 410 and list 415 can be displayed.

In another embodiment, when placed in configure mode and pointer 245 selects toolbar 215, editing window 410 can be displayed. In this embodiment, an additional control 405 can be presented within toolbar 215 that, when selected, causes list 415 of extension points to be displayed. In such an embodiment, editing window 410 can be displayable independently of whether list 415 is displayed.

In any case, editing window 410 and list 415 can be displayed atop or within user interface 200. Editing window 410 can receive computer-usable program code that can be entered by the user to extend the functionality of toolbar 215, and thus computer program 140. For example, the computer-usable program code that can be received by editing window 410 can be in the form of script or a reference to compiled code. It should be appreciated that by "extending the functionality" of toolbar 215 or computer program 140, additional functionality, e.g., an additional function not originally included within computer program 140, can be provided or specified. This is to be contrasted with the creation of a macro, for example, which relies upon new combinations of existing functionality. By allowing a user to specify computer-usable program code, entirely new functions can be created and added to computer program 140. The newly specified functionality for computer program 140 can be referred to as an extension, as will be described in greater detail within this specification.

List 415 of extension points, as noted, can include one or more extension points that exist for toolbar 215. An extension point allows other components or plug-ins to extend or customize portions of the functionality of the plug-in to which the extension point corresponds. Each plug-in can declare zero or more extension points. In this example, the plug-in responsible for toolbar 215 will have declared extension points 420, 425, and 430.

Each extension point can declare an interface, e.g., a contract. For example, the interface can be specified in terms of a combination of Extensible Markup Language (XML) files and/or other programmatic interfaces, e.g., Java, to which an extension that accesses the extension point must conform. A plug-in that wishes to connect to an extension point must implement that interface in their extension. Extension points allow extensibility where the plug-in that is being extended need not be aware of the plug-in that is providing an extension, e.g., a new function.

One type of extension point, for example, can be entirely declarative and, as such, provide no code at all. Examples of such extension points can include those that provide customized key bindings and those that define custom file annotations. Other types of extension points can be used to override default behavior of a component. For example, some extension points allow other plug-ins to replace the implementation of basic operations of the computer program such as deletion. A newly specified deletion function can be used in lieu of the native deletion function of computer program 140 by allowing the newly specified deletion function to access the extension point provided by the computer program associated with the native deletion function or plug-in. This list of available extension points is not intended to be exhaustive, but rather to illustrate different types of extension points that may be provided within a given computer program and the manner in which new functions can be specified.

Each of extension points 420-430 can be application level extension points, system level extension points, or a combination of both. In one aspect, extension points 420-430 can be a subset of the available extension points determined from filtering the available extension points for toolbar 215 according to a selected parameter. For example, extension points can be filtered so that list 415 displays only those extension points that are not part of a user interface supporting set, only extension points related to toolbar 215, only application level extension points, only system-level extension points, or only extension points corresponding to some specified parameter.

The filtering described can be used in the context of a search function. Such a search allows a user to search for a particular extension point or a particular extension that is bound to an extension point and recall the computer-usable program code specifying the extension. The user can copy any desired portion of the computer-usable program code of the extension and paste the selected computer-usable program code into edit window 410 as may be desired as a starting point for creating an extension for toolbar 215.

Access control lists, while described with reference to elements of user interface 200, also can be applied on a per extension point basis. For example, if a user is not permitted to utilize a particular extension point, the reference to that extension point as displayed within list 415 can be darkened or otherwise changed to indicate that it is not available to the user or is not selectable. Alternatively, such an extension point can be filtered as described and not shown within list 415.

In one embodiment, a user may completely specify the extension for a given element such as toolbar 215 within editing window 410. The user may enter computer-usable program code specifying the particular functions and necessary accompanying computer-usable program code to properly access a given extension point for toolbar 215.

In another embodiment, the user can select one of the available extension points 420, 425, or 430. Responsive to that selection, a template of computer-usable program code, e.g., a stub, can be generated and presented within editing window 410. The template can include necessary interface functions, registration metadata, and starter code for specifying an extension to the selected extension point from the list 415. The template further can include comments that provide instructions to the user indicating where any user-specified function is to be placed within the template.

In another embodiment, template generation can be hidden from the user. That is, the template can be generated, but not presented within editing window 410. In that case, for example, the user may simply enter the user-specified function into editing window 410. Upon exiting editing window 410, the user-provided function can be incorporated into, or inserted, into the template in the appropriate location.

In yet another embodiment, one or more input panels can be displayed in the form of a wizard. User specified data can be received through the wizard, e.g., in the form of data or references to code stored elsewhere. A code generator can be invoked to output the extension as a combination of lower-level stub code automatically generated by the code generator which incorporates the user-specified data at the appropriate locations. As used herein, "output" or "outputting" can include, but is not limited to, storing data in memory, e.g., writing to a file, writing to a user display or other output device, e.g., playing audible notifications, sending or transmitting to another system, exporting, or the like.

In any case, responsive to a user command or upon exiting editing window 410, the template and user-specified function(s) can be persisted to, or output to, memory 110 as an extension. The extension can be bound to the user selected extension point.

In one embodiment, the type of computer-usable program code that can be entered into editing window 410 can be script or an interpretive language that does not require compilation. In this manner, the user-specified function can be integrated into the template and output as an extension to toolbar 215 to memory 110. The resulting extension can be invoked, e.g., interpreted upon selection of a control that is included in toolbar 215 and associated with the extension.

In another embodiment, the computer-usable program code that can be entered into editing window 410 can require compilation. In that case, computer program 140 can include compilation functions or the compilation functions can be provided by the IDE within which computer program 140 can be executed. In any case, the user-specified function can be combined with the template and compiled into an extension that can be output to memory 110.

Though not illustrated in FIG. 3, it should be appreciated that a user may select a particular element, e.g., control 210. When control 210 is a control that has previously been defined through an extension technique as described within this specification, selection of control 210 can cause editing window 410 to be displayed with the computer-usable program code previously entered, thereby allowing a user to edit the computer-usable program code. Depending upon the configuration, either the complete extension can be displayed or only those portions that were user-specified, e.g., without displaying any template code.

When the computer-usable program code entered into editing window 410 is persisted to memory 110 and bound to an extension point, toolbar 215 can be modified to appear as shown where control 435 is shown. Control 435 can, when activated, can invoke the newly specified functionality, e.g., invoke or execute the extension associated therewith. In one embodiment, responsive to persisting the extension to memory 110 and creating control 435, user interface 200 can be automatically taken out of configure mode and placed back into normal mode.

In another embodiment, an operation of computer program 140 can be extended through the use of extension points without having to modify an element of a user interface. For example, responsive to placing the computer program in configure mode, a control can be provided that, when selected, provides a list of extension points that are not affiliated with visual elements of the user interface. As discussed, such a list can be filtered, sorted, or the like to allow the user to more easily locate a desired extension point. For example, areas of extensibility that do not have corresponding elements in the user interface can be indicated by a menu that can be displayed within the IDE or in the form of a hanging or added user interface component that only becomes visible when the user interface is placed in configure mode.

In illustration, the underlying functionality of computer program 140 can be changed without providing any user accessible control. Consider the case where computer program 140 is being modified to include functionality to process contacts specified in a format that is not natively supported by computer program 140. An extension point for reformatting contacts may be exposed by a plug-in that operates on contacts within compute program 140. That extension point can be displayed within a list of extension points responsive to one or more user inputs when computer program 140 is placed in configure mode.

Responsive to selecting that extension point from the list, an editing window can be presented with or without appropriate template code. User-specified computer-usable program code that can parse a different contact format and convert the contact format into one that is understood or native to computer program 140 can be inserted into the editing window. When saved or the user exits the editing window, the resulting extension can be output and bound to the extension point, thereby altering the functionality, or native operation, of computer program 140 to now have the ability to process the newly specified contacts format. For example, the prior operation of processing contacts within computer program 140 can be replaced with the extension. The functionality is embedded within computer program 140 and is not tied directly to any element of the user interface. The element of the user interface that was displayed within configure mode to access such extension points can be removed from the user interface when taken out of configure mode.

It should be appreciated that access control lists also can be applied in this example to control which users are able to access extension points that are not affiliated with an element of the user interface. In that case, the access control lists can specify user access on a per extension point basis rather than according to particular elements of the user interface.

While the embodiments described herein have been illustrated largely through the use of toolbar type visual elements, it should be appreciated that the techniques described can be applied to any of a variety of visual elements if such elements correspond to a plug-in that has exposed one or more extension points. For example, menu items can be added to a menu, radio buttons can be added to a region of a user interface, etc. Each of the added controls can be used to invoke new functionality specified through an extension that was not natively included within computer program 140.

Figure 5:
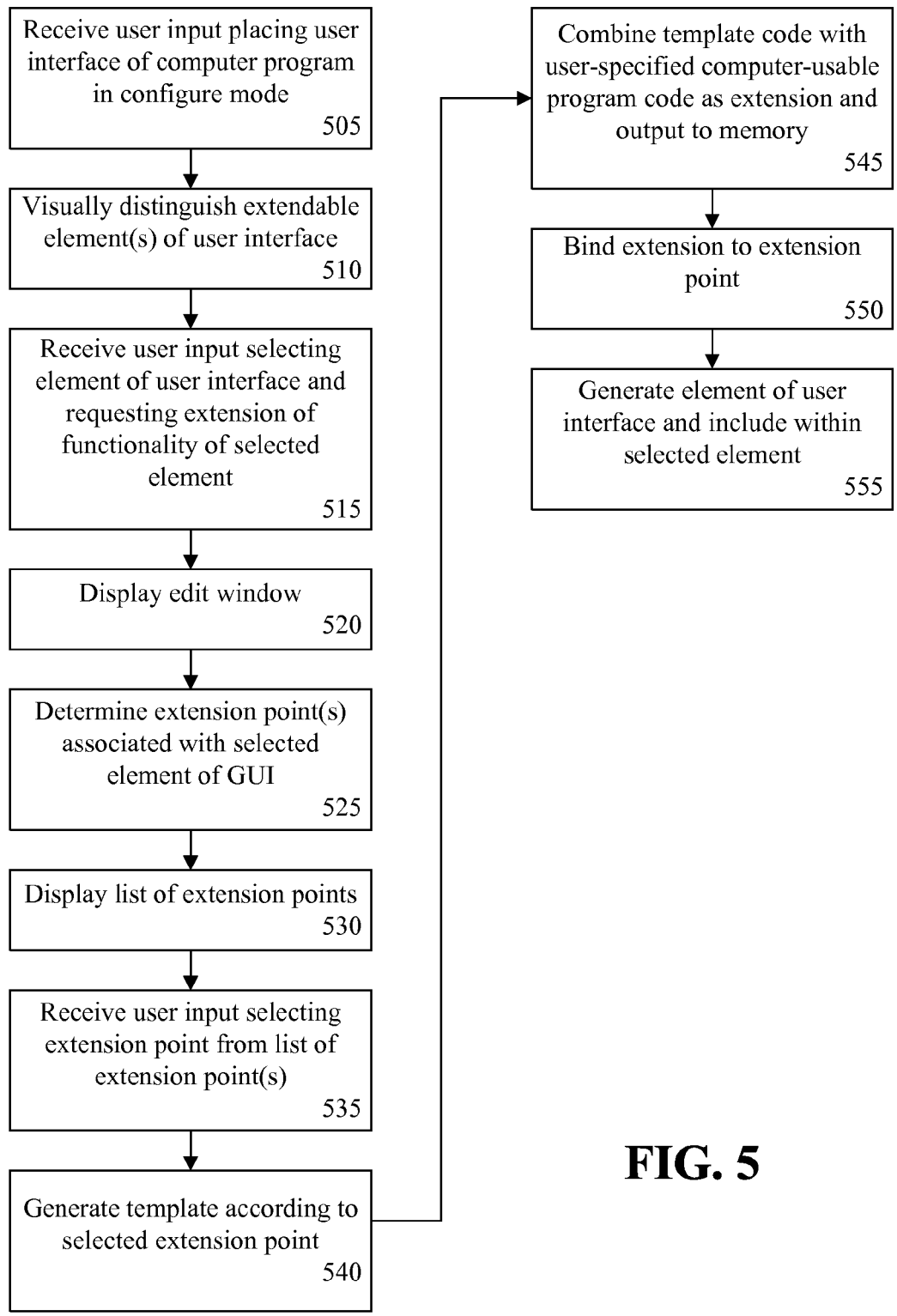
FIG. 5 is a flow chart illustrating a method of extending a user interface of a computer program in accordance with another embodiment of the present invention.

FIG. 5 is a flow chart illustrating a method 500 of extending a user interface of a computer program in accordance with another embodiment of the present invention. The method can be implemented using a system as described with reference to FIGS. 1-4. Accordingly, a system can execute a computer program having a user interface, e.g., a user interface, that can be operated in a normal mode and a configure mode. As noted, the computer program can be executed in a standalone fashion, where the different operational modes are incorporated into the computer program itself, or in a configuration where the computer program executes within an IDE that provides the different operational modes.

Method 500 can begin in step 505, where the system can receive a user input that places the computer program in configure mode. In step 510, the system can visually distinguish one or more elements of the user interface that can be extended. As noted, in one embodiment, the various user interface elements that can be extended, e.g., that have extension points, each can be visually distinguished from those elements of the user interface that do not have extension points. For example, the system can search the available extension points, correlate the extension points to elements of the displayed user interface, and visually distinguish each element according to the extension points found that correlate to each respective element.

In another embodiment, the system can visually distinguish an element in the configure mode only after a selection of the element by the user, e.g., by hovering a pointer over the element or the like. In that case, an element will only be distinguished when at least one extension point is available for the element, the element is selected, and the user interface is in configure mode. As noted, an access control list can be applied to control whether a particular user may extend the functionality of any given element of the user interface.

In step 515, the system can receive a user input that requests extension of the functionality of an element of the user interface. Any of the visually distinguished elements, for example, can be selected, and therefore specified, by the user input requesting extension. In step 520, responsive to the user input, the system can display an edit window through which the user can input computer-usable program code to be included within an extension for the selected element.

In step 525, responsive to the user input, the system can determine each of the extension points associated with the selected element to be extended. That is, each extension point exposed by the plug-in that controls the selected element of the user interface can be determined. In step 530, the system can display the extension points determined in step 525 within a list upon or within the user interface.

In step 535, the system can receive a user input selecting an extension point from the list of extension points. In step 540, the system can generate template code for the selected extension point. As noted, in one embodiment, the generated template code can be placed in the edit window with comments or other indications of where any user specified computer-usable program code, e.g., user-specified functions, are to be inserted. In another embodiment, the generated template can remain hidden such that the user enters only the user-specified function into the edit window. Still, as noted, a wizard style interface can be presented to collect user input.

In step 545, the system can combine the template with the user-provided computer-usable program code to generate an extension that can be output to memory. As noted, depending upon the particular implementation, compilation of the user-specified computer-usable program code and/or the template can be required to generate the extension. In step 550, the extension can be bound to the selected extension point. In step 555, an element can be created and added to the selected element of the user interface of the computer program.

The embodiments described within this specification refer to the use of extension points as a means of extending the functionality of a computer program and/or a user interface of a computer program, e.g., providing extensions. It should be appreciated that the techniques described, however, can be applied with respect to other technologies that can be used to extend the capabilities or functionality of a computer program and/or user interface. For example, the techniques described within this specification can be applied to systems that allow the functionality of a user interface to be extended or customized through the use application programming interfaces (APIs), service provider interfaces (SPIs), or other mechanisms for binding a new function to an existing function.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of extending a user interface of an executing application, the method comprising:
    placing the user interface in a configure mode that allows functionality of the user interface to be extended;
    visually distinguishing an element of the user interface that is extendable;
    responsive to a user input requesting to expand functionality of the element, displaying an editing window within the user interface;
    receiving, within the editing window, computer-usable program code specifying a function for the element; and
    storing the computer-usable program code as part of an extension to the element and binding the extension to an extension point exposed for the element of the user interface.

2. The computer-implemented method of claim 1, further comprising
    selectively allowing a user to extend the functionality of the element according to an access control list defining rights of the user to modify the element of the user interface.

3. The computer-implemented method of claim 1, wherein each extendable element of the user interface is visually distinguished responsive to being placed in configure mode.

4. The computer-implemented method of claim 1, wherein the element of the user interface is visually distinguished only after a user input selects the element.

5. The computer-implemented method of claim 1, further comprising,
    responsive to the user input requesting to expand the functionality of the element, determining each extension point associated with the element.

6. The computer-implemented method of claim 5, further comprising
    displaying a reference to each extension point within a list.

7. The computer-implemented method of claim 6, further comprising
    filtering the list of extension points according to a selected parameter, wherein
    only references to extension points comprising the selected parameter are displayed in the list.

8. The computer-implemented method of claim 6, further comprising, responsive to a selection of a reference to an extension point within the list, automatically generating a template according to the selected extension point, wherein the automatically generated template is combined with the user-specified computer-usable program code to form the extension.

9. A computer-implemented method of extending functionality of a computer program, comprising:

placing the user interface in a configure mode that allows the computer program to be extended;

determining an operation of the computer program that is extendable and that is not represented by an element within the user interface;

displaying an indicator corresponding to the operation based upon the operation being extendable;

responsive to a user selection of the indicator, displaying an editing window within the user interface;

receiving, within the editing window, computer-usable program code specifying a function for the computer program; and storing the computer-usable program code as part of an extension to the operation and binding the extension to an extension point exposed for the operation of the computer program.

10. The computer-implemented method of claim 9, further comprising selectively allowing a user to extend the functionality of the operation according to an access control list defining rights of the user to access the extension point exposed for the operation of the computer program.

11. The computer-implemented method of claim 9, further comprising responsive to the user input selecting the indicator, determining each extension point that is not associated with an element of the user interface.

12. The computer-implemented method of claim 11, further comprising displaying a reference to each extension point within a list.

13. The computer-implemented method of claim 12, further comprising responsive to a selection of a reference to an extension point within the list, automatically generating a template according to the selected extension point, wherein the automatically generated template is combined with the user-specified computer-usable program code to form the extension.

14. A computer program product comprising a computer-usable storage medium having stored therein computer-usable program code for extending a user interface of an executing application, the computer-usable program code, which when executed by a computer hardware system, causes the computer hardware system to perform:

placing the user interface in a configure mode that allows functionality of the user interface to be extended;

visually distinguishing an element of the user interface based upon the element being extendable;

responsive to a user input requesting to extend the functionality of the element, displaying an editing window within the user interface;

receiving, within the editing window, computer-usable program code specifying extended functionality for the element;

storing the computer-usable program code as part of an extension to the element; and binding the extension to an extension point exposed for the element of the user interface.

15. The computer program product of claim 14, wherein the computer-usable program code further causes the computer hardware system to perform:

selectively allowing a user to extend the functionality of the element according to an access control list defining rights of the user to modify the element of the user interface.

16. The computer program product of claim 14, wherein each extendable element of the user interface is visually distinguished responsive to being placed in configure mode.

17. The computer program product of claim 14, wherein the element of the user interface is visually distinguished only after a user input selects the element.

18. The computer program product of claim 14, wherein the computer-usable program code further causes the computer hardware system to perform:

responsive to the user input requesting to extend the functionality of the element, determining each extension point associated with the element.

19. The computer program product of claim 18, wherein the computer-usable program code further causes the computer hardware system to perform:

displaying a reference to each extension point within a list.

20. The computer program product of claim 19, wherein the computer-usable program code further causes the computer hardware system to perform:

responsive to a selection of a reference to an extension point within the list, automatically generating a template according to the selected extension point, wherein the automatically generated template is combined with the user-specified computer-usable program code to form the extension.

* * * * *